US010064154B2

(12) United States Patent
Banin et al.

(10) Patent No.: US 10,064,154 B2
(45) Date of Patent: Aug. 28, 2018

(54) SYSTEM AND METHOD FOR CHANNEL INFORMATION EXCHANGE FOR TIME OF FLIGHT RANGE DETERMINATION (71) Applicant: Intel Corporation, Santa Clara, CA (US)

(72) Inventors: Leor Banin, Petach Tikva (IL); Yuval Amizur, Kfar-Saba (IL); Uri Schatzberg, Kiryat Ono (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/015,308

(22) Filed: Feb. 4, 2016

(65) Prior Publication Data
US 2017/0013584 A1    Jan. 12, 2017

Related U.S. Application Data (63) Continuation of application No. 14/127,385, filed as application No. PCT/US2013/060420 on Sep. 18, 2013, now Pat. No. 9,261,580.
(Continued)

(51) Int. Cl.
*H04W 4/00*    (2018.01)
*H04W 64/00*    (2009.01)
(Continued)

(52) U.S. Cl.
CPC ........... *H04W 64/00* (2013.01); *G01S 5/0205* (2013.01); *G01S 5/0236* (2013.01); *G01S 5/0284* (2013.01);
(Continued)

(58) Field of Classification Search
CPC ..... H04W 64/09; H04W 4/023; H04W 84/12; G01S 5/0236; G01S 5/0284; G01S 5/14
See application file for complete search history.

(56) References Cited

U.S. PATENT DOCUMENTS 6,477,380 B1    11/2002  Uehara et al.
7,996,020 B1     8/2011  Chhabra
(Continued)

FOREIGN PATENT DOCUMENTS

CN    1698390 A    11/2005
CN    1777158 A     5/2006
(Continued)

OTHER PUBLICATIONS

"U.S. Appl. No. 14/127,385, Non Final Office Action dated Jun. 29, 2015", 16 pgs.
(Continued)

*Primary Examiner* — Barry W Taylor
(74) *Attorney, Agent, or Firm* — Schwegman Lundberg & Woessner, P.A.

(57)    ABSTRACT

A system for time-of-flight (ToF) positioning in an IEEE 802.11 network comprises an initiating station that transmits a request frame over a channel to a responding station for a ToF position measurement. The responding station may respond with an offloading of the channel information, request frame receipt time, and response frame transmit time back to the initiating station to enable the initiating station to calculate the ToF position with respect to the responding station.

22 Claims, 6 Drawing Sheets

Related U.S. Application Data (60) Provisional application No. 61/773,399, filed on Mar. 6, 2013.

(51) Int. Cl.
*G01S 5/14* (2006.01)
*G01S 5/02* (2010.01)
*G01S 5/10* (2006.01)
*H04W 4/02* (2018.01)
*G01S 13/87* (2006.01)
*G01S 5/06* (2006.01)
*H04W 84/12* (2009.01)

(52) U.S. Cl.
CPC .......... *G01S 5/10* (2013.01); *G01S 5/14* (2013.01); *G01S 13/878* (2013.01); *H04W 4/023* (2013.01); *G01S 5/06* (2013.01); *H04W 84/12* (2013.01)

(56) References Cited

U.S. PATENT DOCUMENTS

| | | | |
|---|---|---|---|
| 9,261,580 B2 | 2/2016 | Banin et al. | |
| 2005/0058081 A1 | 3/2005 | Elliott | |
| 2005/0136972 A1* | 6/2005 | Smith | H04B 3/542 455/554.1 |
| 2006/0102846 A1 | 5/2006 | Manjeshwar et al. | |
| 2006/0104198 A1 | 5/2006 | Takano | |
| 2008/0284639 A1 | 11/2008 | Sahinoglu | |
| 2009/0270042 A1* | 10/2009 | Miscopein | H04W 64/00 455/67.11 |
| 2010/0135178 A1 | 6/2010 | Aggarwal et al. | |
| 2010/0157810 A1 | 6/2010 | Oh et al. | |
| 2010/0203839 A1 | 8/2010 | Duan et al. | |
| 2011/0199946 A1* | 8/2011 | Breit | H04B 7/0626 370/310 |
| 2012/0026041 A1 | 2/2012 | Murdock et al. | |
| 2012/0032855 A1 | 2/2012 | Reede et al. | |
| 2012/0163261 A1 | 6/2012 | Vedantham et al. | |
| 2012/0269170 A1 | 10/2012 | Chen et al. | |
| 2013/0034003 A1 | 2/2013 | Shapira | |
| 2013/0058239 A1* | 3/2013 | Wang | H04B 7/0417 370/252 |
| 2013/0223261 A1 | 8/2013 | Aggarwal et al. | |
| 2013/0237246 A1 | 9/2013 | Aggarwal et al. | |
| 2013/0301441 A1 | 11/2013 | Russell et al. | |
| 2014/0073352 A1* | 3/2014 | Aldana | G01S 5/10 455/456.1 |
| 2015/0168536 A1 | 6/2015 | Banin et al. | |

FOREIGN PATENT DOCUMENTS

| | | |
|---|---|---|
| CN | 1833182 A | 9/2006 |
| CN | 101112112 A | 1/2008 |
| CN | 101198163 A | 6/2008 |
| CN | 101958869 A | 1/2011 |
| CN | 101960903 A | 1/2011 |
| CN | 102265174 A | 11/2011 |
| CN | 102474882 A | 5/2012 |
| CN | 104981711 A | 10/2015 |
| EP | 1992964 A2 | 11/2008 |
| EP | 2527860 A2 | 11/2012 |
| EP | 2527861 A2 | 11/2012 |
| EP | 2600165 A1 | 6/2013 |
| EP | 2746802 A1 | 6/2014 |
| FR | 2880508 A1 | 7/2006 |
| JP | 2006148457 A | 6/2006 |
| JP | 2008527769 A | 7/2008 |
| JP | 2008286782 A | 11/2008 |
| JP | 2010166266 A | 7/2010 |
| JP | 2010187359 A | 8/2010 |
| JP | 2012509483 A | 4/2012 |
| KR | 1020110089431 A | 8/2011 |
| KR | 101826213 | 1/2018 |
| TW | 201116003 A | 5/2011 |
| TW | 201144847 A | 12/2011 |
| WO | 9949333 A1 | 9/1999 |
| WO | WO-2006072697 A1 | 7/2006 |
| WO | WO-2010059934 A2 | 5/2010 |
| WO | WO-2010103990 A1 | 9/2010 |
| WO | 201413791 A1 | 9/2014 |

OTHER PUBLICATIONS

"U.S. Appl. No. 14/127,385, Notice of Allowance dated Sep. 9, 2015", 5 pgs.

"U.S. Appl. No. 14/127,385, Preliminary Amendment filed Dec. 18, 2013", 3 pgs.

"U.S. Appl. No. 14/127,385, Response filed Aug. 31, 2015 to Non Final Office Action dated Jun. 29, 2015", 11 pgs.

"European Application Serial No. 13877106.8, Amendment filed Aug. 4, 2015", 20 pgs.

"International Application Serial No. PCT/US2013/060420, International Preliminary Report on Patentability dated Sep. 17, 2015", 11 pgs.

"International Application Serial No. PCT/US2013/060420, International Search Report dated Dec. 16, 2013", 3 pgs.

"International Application Serial No. PCT/US2013/060420, Written Opinion dated Dec. 16, 2013", 9 pgs.

"Taiwanese Application Serial No. 103107484, Office Action dated Mar. 25, 2015", 9 pgs.

"Taiwanese Application Serial No. 103107484, Response filed Jun. 18, 2015 to Office Action dated Mar. 25, 2015", 90 pgs.

"Chinese Application Serial No. 201380072206.9, Office Action dated Mar. 24, 2017", w/ English Translation, 9 pgs.

"Chinese Application Serial No. 201380072206.9, Office Action dated Jul. 25, 2016", w/English Translation, 23 pgs.

"Chinese Application Serial No. 201380072206.9, Response filed Dec. 9, 2016 to Office Action dated Jul. 25, 2016", w/English Claims, 63 pgs.

"European Application Serial No. 13877106.8, Extended European Search Report dated Oct. 5, 2016", 14 pgs.

"European Application Serial No. 13877106.8, Response filed May 5, 2017 to Extended European Search Report dated Oct. 5, 2016", 15 pgs.

"Japanese Application Serial No. 2015-557996, Office Action dated Aug. 2, 20160", W/ English Translation, 13 pgs.

"Japanese Application Serial No. 2015-557996, Response filed Nov. 1, 2016 to Office Action dated Aug. 2, 2016", w/English Claims.

"Korean Application Serial No. 2015-7021165, Office Action dated Apr. 17, 2017", w/English Translation, 12 pgs.

Ciurana, M, et al., "A robust to multi-path ranging technique over IEEE 802.11 networks", Wireless Networks; The Journal of Mobile Communication, Computation and Information, Kluwer Academic Publishers, DO, vol. 16, No. 4, (Apr. 29, 2009), 943-953.

Haustein, Mario, "Lokalisierung dumb Messung von WLAN-Signallaufzeiten", Retrieved from the Internet: <URL:https://chemnitzer.linux- tage.de/2011/vortraege/folien/653_haustein.pdf> [retrieved on Sep. 1, 2016], (Mar. 19, 2011).

"European Application Serial No. 13877106.8, Amendment filed Mar. 13, 2018", 6 pgs.

"European Application Serial No. 13877106.8, Communication Pursuant to Article 94(3) EPC dated Mar. 23, 2018", 4 pgs.

"Chinese Application Serial No. 201380072206.9, Response filed Jun. 8, 2017 to Office Action dated Mar. 24, 2017", w/ English Claims, 16 pgs.

"Chinese Application Serial No. 201380072206.9, Response filed Dec. 12, 2017 to Office Action dated Sep. 28, 2017", w/ English Claims, 13 pgs.

"Chinese Application Serial No. 201380072206.9, Office Action dated Apr. 23, 2018", w/ concise statement of relevance, 6 pgs.

"Chinese Application Serial No. 201380072206.9, Response filed Jul. 6, 2018 to Office Action dated Apr. 23, 2018", w/ English Claims, 14 pgs.

* cited by examiner

SYSTEM AND METHOD FOR CHANNEL INFORMATION EXCHANGE FOR TIME OF FLIGHT RANGE DETERMINATION

RELATED APPLICATION

This application is a continuation of U.S. patent application Ser. No. 14/127,385, filed Dec. 18, 2013, which is a U.S. National Stage Application under 35 U.S.C. 371 from International Application No. PCT/US2013/060420, filed Sep. 18, 2013, published in English as WO 2014/137391 on Sep. 12, 2014, which claims the benefit of priority to U.S. Provisional Patent Application Ser. No. 61/773,399, filed Mar. 6, 2013, each of which is incorporated herein by reference.

TECHNICAL FIELD

Embodiments pertain to wireless network communications. Some embodiments relate to the IEEE 802.11 standards. Some embodiments relate to WiFi networks. Some embodiments relate to beamforming. Some embodiments relate to channel feedback, location positioning, and time-of-flight (ToF).

BACKGROUND

Outdoor navigation is widely deployed through the use of various global-navigation-satellite-systems (GNSS) such as the U.S. Global Positioning System (GPS), the Russian Global Navigation Satellite System (GLONASS), and the European GAL/LEO. These systems may operate effectively outdoors but, due to satellite reception problems, may not be very effective indoors.

Relatively recently, there has been a focus on solving indoor navigation problems. One solution may be based on Time-of-Flight (ToF) methods. Time-of-Flight may be defined as the overall time a signal propagates from a mobile communication station (e.g., user) to an access point (AP) and back to the user. This value may then be converted into distance by dividing the time by two and multiplying the result by the speed of light. This method may be robust and scalable but may require hardware changes to the Wi-Fi modem.

There are general needs for performing indoor navigation out of range of the GNSS.

DESCRIPTION OF EMBODIMENTS

Subsequently described embodiments refer to WiFi communication systems and Institute of Electrical and Electronics Engineers (IEEE) 802.11 (i.e., a set of physical layer standards for implementing wireless local area network (WLAN) computer communication). However, the present embodiments are not restricted to only a WiFi communication system or any particular communication standard. The present embodiments may be used in any communication system in which location and navigation capabilities may be desired.

Time-of-Flight (ToF) positioning methods may provide a way to determine a mobile station's location in an environment where GNSS may not be available (e.g., indoors). Typical ToF methods may pose a barrier to entry since only those manufacturers having both navigation and Win technologies may implement this kind of solution.

In present communication systems, two wireless communication stations may calculate a time-of-arrival (ToA) independently in order to perform a WiFi distance measurement. Each station may combine a Time of Arrival (ToA) of a frame with the Time of Departure (ToD) of the frame in order to determine around trip time between the stations. Multiplying the round trip time by the speed of light and dividing by two may result in a distance from a station.

The ToA calculation may be based on an analysis of channel information. The channel information refers to known channel properties of a communication link. The channel information may describe how a signal propagates from a transmitter to a receiver and may represent the combined effects of, for example, scattering, fading, and power decay with distance. The channel information may be described as a snapshot of the channel at a particular time, since the channel information may change as a mobile station moves about an area. Thus, new channel information may be used during each ToA calculation.

Figure 3:
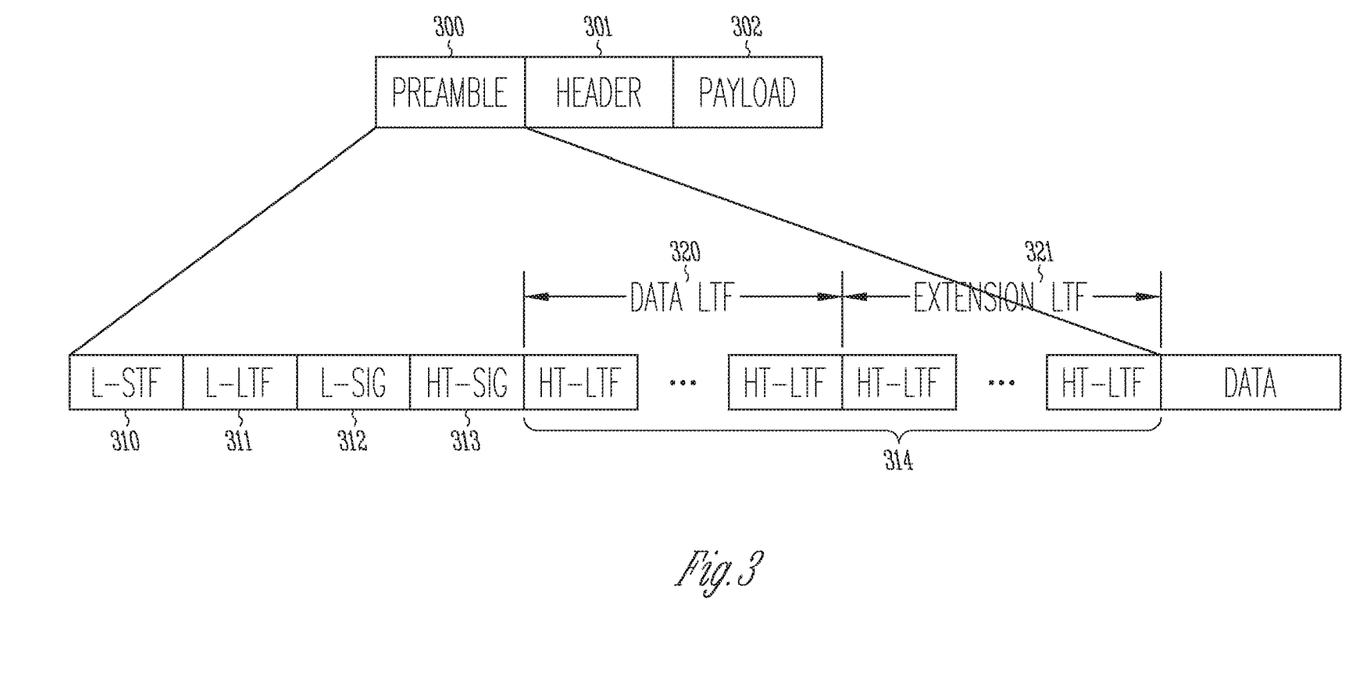
FIG. 3 illustrates a diagram of an embodiment of a frame structure in accordance with some embodiments.

The channel information for each channel may be determined by determining a distortion caused to a preamble of a frame transmitted over the channel. One example of such a preamble is illustrated in FIG. 3 and described subsequently. Since the expected preamble may be known by the receiver as a standard preamble and the preamble as actually received may be now known, the receiver can determine the channel information by the distortion caused to the expected preamble.

Each station independently performing its own ToA analysis may introduce errors into the calculations due to only one side of the channel being taken into account. These errors may result in tens of meters of variation.

A solution to this problem may be to have one station transfer its channel information to the other station. Thus the ToF calculation may be offloaded to only one station to improve the quality of the range estimation. More particularly, embodiments provide a protocol to transfer the channel information from one side (e.g., a passive partner that only measures the Channel information) to the other side (e.g., the "smart" partner) that may calculate the range estimation. Another advantage of this protocol may be the flexibility in choosing a type of offloading processing (e.g., from client to network, from network to client, or some combined method). The channel from the other side may be used to improve the quality of the range estimation by, for example: calculating a plurality of ToA hypotheses for each channel and select the best pair having the best likelihood of success, due to the physical Channel nature where both channels are very similar, the two channels may be merged for an improved signal-to-noise ratio (SNR), or a combined estimation of range.

The channel information may be transferred to the other side of the channel by any one of a plurality of different methods. For example, the entire, uncompressed channel information may be transferred, the channel information may be compressed, the channel information may be decimated in frequency, or a list of hypotheses (with or without weighting) for potential ToA timings may be transferred. The present embodiments are not limited to just these channel information transfer methods.

In addition to improved accuracy and performance for ToF distance calculations, the present embodiments may allow a station e.g., access point) that cannot handle multiple users with respect to inadequate processing power and/or memory for calculation of the ToA to offload most of the processing to other stations. Additionally, low power devices (e.g., mobile wireless stations) may offload the ToF distance calculations to a more powerful access point or its backbone.

Figure 1:
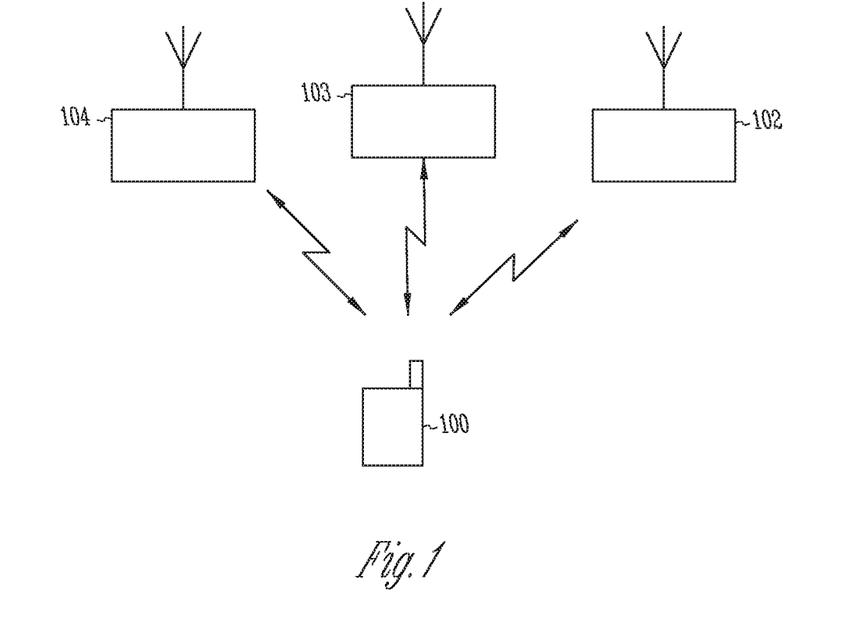
FIG. 1 illustrates a block diagram of an embodiment of a wireless communication system in accordance with some embodiments.

FIG. 1 illustrates various network elements of a wireless communication network in accordance with some embodiments. The wireless communication network includes one or more wireless communication stations 100, 102-104 that may include a mobile wireless station 100 and a plurality of access points (APs) 102-104 that may communicate over one or more wireless channels in accordance with IEEE 802.11 communication techniques.

The mobile wireless station 100 may be a mobile communication device that is non-stationary. Such a communication device may include mobile radiotelephones, tablet computers, lap top computers, and other communication devices that may communicate with the access points 102-104 over one or more wireless channels using a communication technique (e.g., IEEE 802.11).

The access points 102-104 may have fixed locations. The access points 102-104 may be part of a stationary network that may be coupled to a larger network (e.g., local area network (LAN), wide area network (WAN)). For example, the access points 102-104 may be part of a wired network that is coupled to the Internet. The mobile wireless station 100 may then access the larger network by communicating over the wireless channels with the access points 102-104.

It may be desirable for the mobile wireless station 100 to know its location with relation to the access points 102-104. Since the geographical locations of the access points 102-104 may be fixed and known, the geographical location of the mobile wireless station 100 may be determined by trilateration and tracked thereafter. The trilateration may be accomplished by using ToF calculations. In another embodiment, the access points 102-104 may be mobile and their location may be determined by GNSS or some other means.

Figure 2:
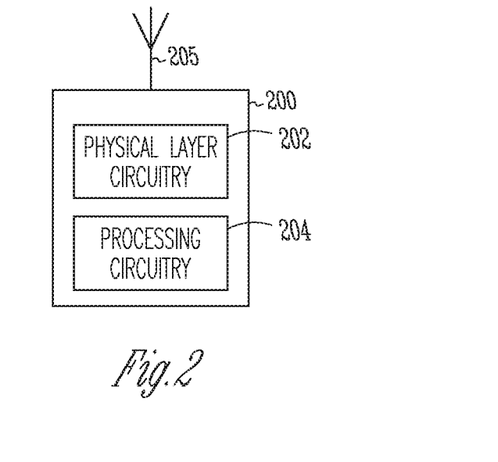
FIG. 2 illustrates a block diagram of an embodiment of a wireless communication station in accordance with some embodiments.

FIG. 2 is a functional block diagram of a wireless communication station in accordance with some embodiments. Communication station 200 may be suitable for use as a mobile wireless communicator 100 (FIG. 1) or any of the access points 102-104 (FIG. 1), although other configurations may also be suitable.

Communication station 200 may include physical layer circuitry 202 to communicate wirelessly with access points, mobile communication devices, and other communication stations over one or more antennas 205. Communication station 200 may also include processing circuitry 204 coupled to the physical layer circuitry 202 to perform other operations described herein.

In accordance with embodiments, the physical layer circuitry 202 may be configured to transmit and receive ToF messages between communication stations. The physical layer circuitry 202 may also be configured to transmit and receive acknowledgments as well as other communications between communication stations. The physical layer circuitry 202 may be configured to modulate digital data from the processing circuitry 204 for transmission over a channel as well as demodulate received modulated signals into digital data for use by the processing circuitry 204.

In accordance with embodiments, the processing circuitry 204 may be configured to calculate ToF measurements. The processing circuitry 204 may also be configured to calculate time intervals such as ToA and ToD.

Although communication station 200 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of communication station 200 may refer to one or more processes operating on one or more processing elements.

In some embodiments, communication station 200 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device e.g., a heart rate monitor, a blood pressure monitor, etc.), or other device that may receive and/or transmit information wirelessly. In some embodiments, a communication station may include one or more of a keyboard, a display, a non-volatile memory port, multiple antennas, a graphics processor, an application processor, speakers, and other mobile device elements. The display may be an LCD or LED screen, including a touch screen.

The wireless communication stations 100, 102-104 in the network may communicate with each other over the one or more wireless channels using a frame structure. Some embodiments may also refer to the frame as a packet. FIG. 3 illustrates one embodiment of such a frame structure that may be used in one or more standards of IEEE 802.11.

The basic frame structure may include a preamble 300, header 301, and payload 301. The preamble 300 may include numerous sub-fields 310-314, as described subsequently, and may serve to alert a receiver (e.g., radio) of a wireless communication station 100, 102-104 that a transmission is about to start. The preamble 301 then enables the receiver to synchronize with the incoming transmission using a plurality of training sub-fields 314.

The header 301 may immediately follow the preamble 300 in the frame. The header 301 may include information regarding the payload 302 to follow including the length of the data within the payload 302.

The payload 302 may include the data that may be desired to be transferred to another wireless communication station 100, 102-104. In the IEEE 802.11 standards, the payload may range from 64-1500 bytes. Other embodiments may have different size payloads. The payload 302 may be modulated using the same modulation scheme as the preamble 300 and header 301 or a different modulation scheme may be used.

The preamble 300 may include numerous sub-fields 310-314. For example, the preamble 300 may include numerous legacy fields 310-312 that may be used in older versions of a communication standard (e.g., 802.11a/g). Such legacy sub-fields 310-312 may enable communication with both wireless communication stations using new standards as well as wireless communication stations using the older standards.

The legacy sub-fields 310-312 may include training fields such as a legacy short training field (L-STF) 310 and a legacy long training field (L-LTF) 311. The legacy sub-fields 310-312 may further include a legacy signal field (L-SIG) 312 that may be used to transfer a rate and length information of the frame.

Other preamble sub-fields 310-314 may include a high throughput signal field (HT-SIG) 313 that may provide means to carry information used to interpret HT packet formats. A plurality of high throughput long training fields (HT-LTF) 314 may provide means for the receiver to estimate the channel between each spatial mapping input and receiver.

The HT-LIT 314 subfields, in the present embodiments, may comprise one or more portions. The first portion 320 may be referred to as data HT-LTF's and the second portion 321 may be referred to as extension HT-LTF's.

The data HT-LTF sub-fields 320 may be used for demodulation of a high throughput data portion of the payload 302. This portion 320 may comprise one or more sub-fields and may be located immediately adjacent to the HT-SIG field 313.

The extension HT-LTF sub-fields 321 may be used for probing extra spatial dimensions of the channel that may not be utilized by the HT-LTF data portion 320. This portion 321 may comprise one or more sub-fields and may be located immediately after the data HT-LTF data portion 320 and prior to the payload data.

Subsequent discussion refers to "initiating station" and "responding station". The initiating station may be either the mobile wireless station 100 or one of the access points 102-104. Similarly, the responding station may be either the mobile wireless station 100 or one of the access points 102-104. The initiating station may be defined as the station that initiates the ToF request. The responding station may be defined as the station that responds to the ToF request.

Figure 4:
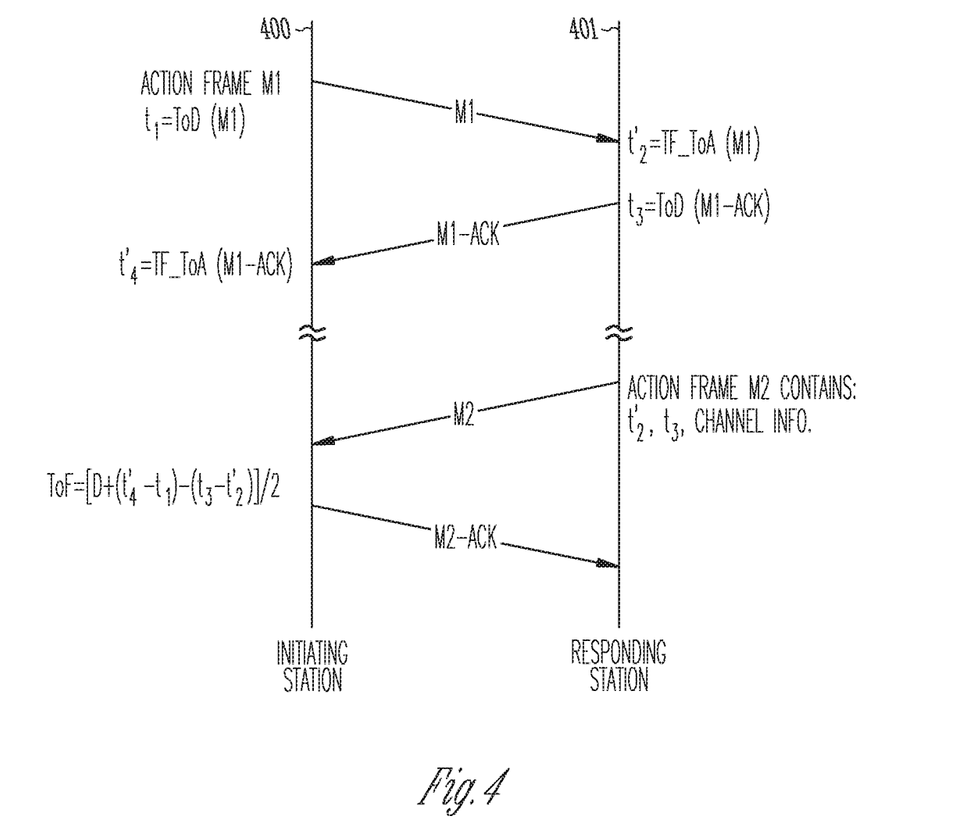
FIG. 4 illustrates a protocol flow diagram for ToF distance measurement for offloading ToF calculations to an initiating station in accordance with some embodiments.

FIG. 4 illustrates a protocol flow diagram for ToF distance measurement for offloading ToF calculations to an initiating station in accordance with some embodiments. In this embodiment, instead of the responding station sending ToF request frame received time and response frame transmit times to the initiating station, as is done in the prior art, unprocessed information on the responding station side may be transmitted to the initiating station side. The initiating station side may then derive these times. Thus, all of the ToF distance measurement calculations may then be performed on the initiating station side.

The unprocessed information may include channel information as determined by the other side. In other words, channel information transmitted by the responding station may include the channel information of the channel from the initiating station to the responding station.

The protocol flow diagram shows that the initiating station 400 begins by transmitting an action frame M1 to the responding station 401. In an embodiment, the M1 frame is a request for ToF distance measurement. The M1 frame is shown being transmitted by the initiating station 400 at time of departure (ToD)=$t_1$. The M1 frame is received by the responding station 401 at a training frame time of arrival (TF_ToA)=$t_2$.

The TF_TOA is differentiated from the actual action frame time of arrival by the use of the "prime" indication. In other words, $t_2'$ is the training frame ToA whereas $t_2$ would be the actual ToA of M1 after correction from the channel information.

The responding station 401 may transmit an acknowledgement frame M1-ACK to the initiating station 400 at ToD(M1-ACK)=$t_3$. The M1-ACK. frame may be received at the initiating station 400 at TF_ToA=$t_4'$. Thus, $t_2'$ and $t_4'$ both refer to the time of arrival of the training frame used to calculate the channel information.

The acknowledgement frame M1-ACK may be used for multiple functions. The M1-ACK may be used by the responding station 401 to inform the initiating station 400 that the ToF request was received. The training frame of M1-ACK may be used by the initiating station 400 to determine the channel information for the channel from the responding station 401 to the initiating station 400.

Since the responding station 401 may be offloading the ToF calculations to the initiating station 400, the responding station 401 now transmits an action frame M2 to the initiating station 400. The M2 frame may include the information packet that may be transmitted to the initiating station 400 for calculating the ToF distance information. The M2 frame may include the times $t_2'$ and $t_3$ and the channel information for the channel from the initiating station 400 to the responding station 401. The M2 frame may also include tokens, other time offsets, and frequency offsets. In another embodiment, the M2 frame may be transmitted with the times received from (transmission not shown) the initiating station 400 such as $t_4'$, $t_1$ and the channel information. In another embodiment, the frame M2 may be transmitted as shown but an M3 frame may then be transmitted from the initiating station 400 to the responding station 401 with corresponding $t_4'$, $t_1$ and the channel information.

The M2 frame may also include a start time (e.g., location) of a particular symbol within the M1 frame. The symbol may be a modulated preamble field such as an HT-LTF or another preamble field. The symbol start time, $t_{symStart}$, may be defined as a location within the M1 frame in which the particular symbol starts. For example, the responding station 401 may know how far in to the frame the particular symbol starts. This symbol start time may then be transmitted to the initiating station 400 in the channel information field of M2.

Thus, the M1 frame may be used for measurement and the M2 frame may be used to transfer the information packet to the initiating station 400 for calculating the ToF distance measurement. The above-described information received in the M2 frame may then be used by the initiating station 400 to determine an estimation of the channel information for the channel from the responding station 401 to the initiating station 400. This estimation of the channel information may then be used by the initiating station 400 in determining the ToA of the M2 frame at the initiating station 400.

The ToA of the M2 frame at the initialing station 400 may be determined by $t_{ToA}=t_{symbStart}+\Delta t-t_{HW\text{-}delay}$, where $t_{symbStart}$ is the start time of the symbol as previously described, $\Delta t$ is a time difference between $t_{symbStart}$ and the first line of sight peak as described subsequently, and $t_{HW\text{-}delay}$ is an inherent hardware delay imposed by the responding station 401 during transmission of M2.

Figure 5:
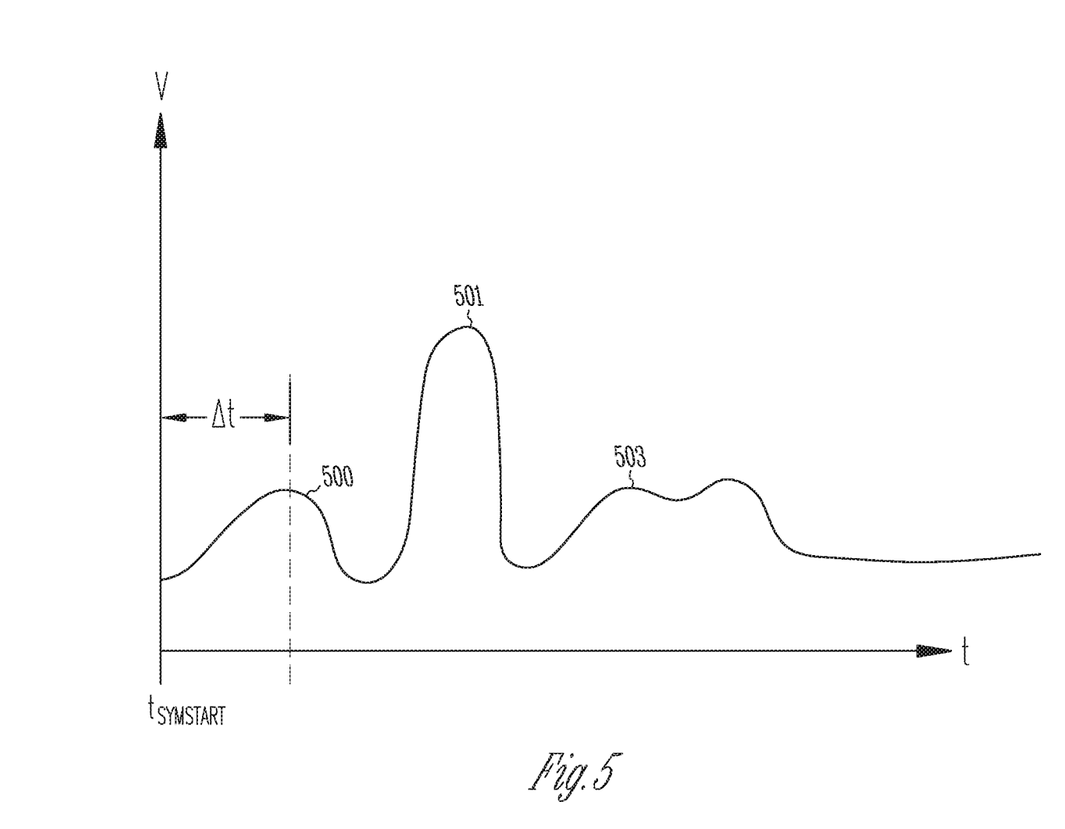
FIG. 5 illustrates a typical time domain signal transmitted over a channel in the wireless communication system of FIG. 1.

FIG. 5 illustrates a typical time domain signal transmitted over a channel in the wireless communication system of FIG. 1. This signal may be a multipath signal as received at the initiating station 400 that may result from the signal reflecting off different surfaces and arriving at the initiating station 400 at different times. The initial peak 500 may be the line of sight (LoS) received signal as received directly from the responding station 401 without any reflections. Another peak 501 may be a second path that, while stronger, arrives at a later time. Another peak 503 may be a third path that is received even later. The time Δt may be defined as the time from $t_{symStart}$ until the first LoS peak is received.

Once the initiating station 400 has determined the ToA as discussed previously, the initiating station 400 may now determine the ToF distance measurement. This may be accomplished by ToF=[D+(t$_4$'−t$_1$)−(t$_3$−t$_2$')]/2 where D is a difference between the actual ToF and the ToF-like-calculation performed with the "prime" marked times. In other words, D may represent the sum of corrections from the two channel information or one correction from two channel information, depending on which offloading scheme may be used.

Figure 6:
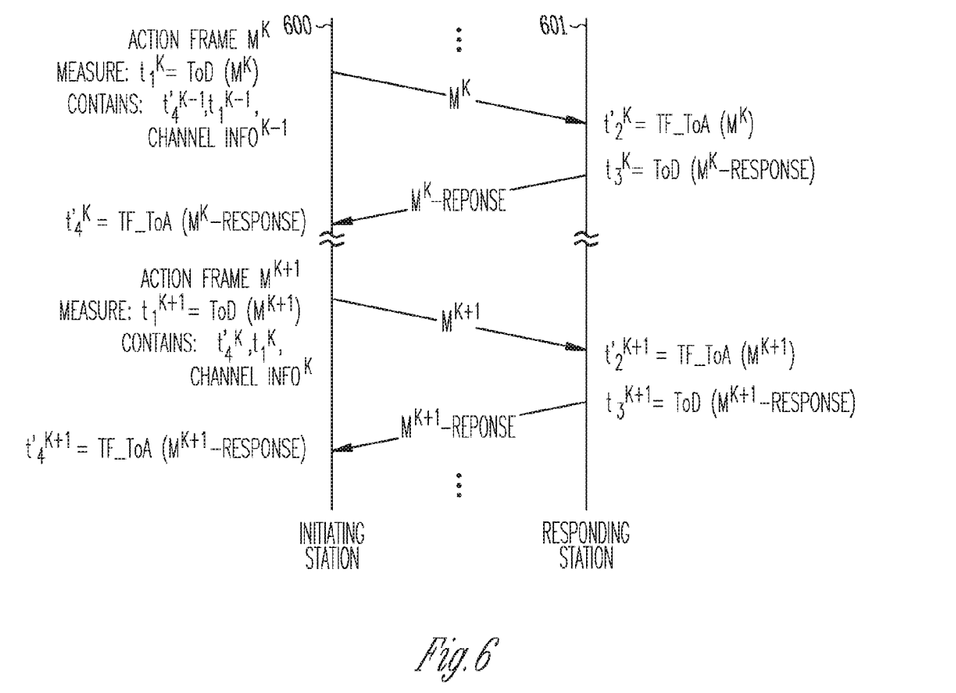
FIG. 6 illustrates a protocol flow diagram for ToF distance measurements for offloading ToF calculations to a responding station in accordance with some embodiments.

FIG. 6 illustrates a protocol flow diagram for ToF distance measurements for offloading ToF calculations to a responding station 601 in accordance with some embodiments. In this embodiment, the ToF calculations may be performed on the responding station 601 side.

The protocol flow diagram illustrates ToF distance measurement calculations being performed on a continuous basis over a period of time instead of the instantaneous measurement and calculation illustrated in FIG. 4. However, neither the embodiment illustrated in FIG. 4 nor the embodiment illustrated in FIG. 6 are limited to either instantaneous or continuous calculations of the ToF distance measurement.

Referring to FIG. 6, the initiating station 600 may transmit action frame M$^k$ for ToF measurement requests to the responding station 601. The ToD(M$^k$)=$t_1^k$ for the M$^k$ frame. The M$^k$ frame may comprise the previous times $t_4'^{(k-1)}$, $t_1^{k-1}$, and the channel information of the previous measurement (i.e., channel information$^{(k-1)}$) for the channel from the responding station 601 to the initiating station 600. In another embodiment, the action frame M$^k$ may be used for the next measurement of ToF distance.

The responding station 601 receives the training frame of the M$^k$ frame at TF_ToA(M$^k$)=$t_2'^k$. The responding station 601 may then transmit a M$^k$ response frame at times ToD(M$^k$ response)=$t_3^k$. The D$^{(k-1)}$ may be calculated at the responding station 601 from the channel information from both sides initiating station to responding station and responding station to initiating station). Thus the ToF$^{k-1}$=[D$^{(k-1)}$+($t_4'^{(k-1)}$−$t_1^{(k-1)}$)−($t_3^{(k-1)}$−$t_2'^{(k-1)}$)]/2. The M$^k$ responses transmitted to the initiating station 600 may then include the requested ToF. The responding station 600 may receive the training frame of the M$^k$ response frame at $t_4'^k$=TF_ToA(M$^k$ Response).

As seen in FIG. 6, the above protocol flow for the k−1 frame may continue with the k+1 frame. Thus, the initiating station 600 may transmit action frame M$^{(k+1)}$ for the ToF measurement request to the responding station 601. The ToD(M$^{k+1}$)=$t_1^{(k+1)}$ for frame. The M$^{(k+1)}$ frame may comprise the previous times $t_4'^k$, $t_1^k$, and the channel information of the previous measurement (i.e., Channel information$^{(k)}$) for the channel from the responding station 601 to the initiating station 600. In another embodiment, the offloading frame M$^{(k+1)}$ may be used for the next measurement of ToF distance.

The responding station 601 receives the training frame of the M$^{(k+1)}$ frame at TF_ToA(M$^{(k+1)}$)=$t_2'^{(k+1)}$. The responding station 601 may then transmit the M$^k$ response frame at ToD(M$^k$ response)=$t_3^{k+1}$. The D$^k$ may be calculated at the responding station 601 from the channel information from both sides (i.e., initiating station to responding station and responding station to initiating station). Thus the ToF$^k$=[D$^k$+($t_4'^k$−$t_1^k$)−($t_3^k$−$t_2'^k$)]/2. The M$^{k+1}$ response transmitted to the initiating station 600 may then include the requested ToF. The responding station 600 may receive the training frame of the M$^{k+1}$ response frame at $t_4'^{(k+1)}$=TF_ToA(M$^{k+1}$ Response).

Figure 7:
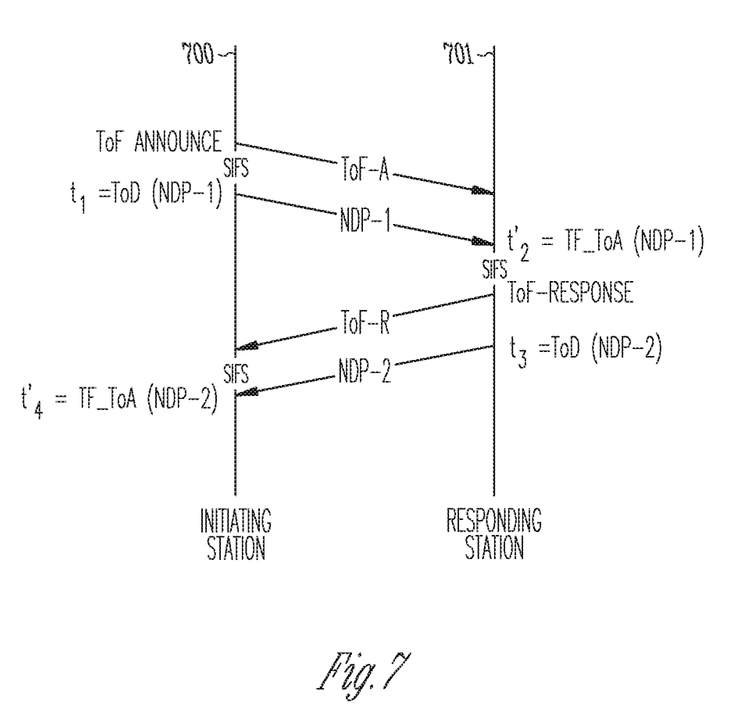
FIG. 7 illustrates a protocol flow diagram for ToF distance measurements for offloading ToF calculations to an initiating station using null data packet-like bi-directional channel estimation in accordance with some embodiments.

FIG. 7 illustrates a protocol flow diagram for ToF distance measurements for offloading ToF calculations to an initiating station using null data packet-like bi-directional channel estimation. The initiating station 700 may transmit a frame that performs a ToF announce function. This frame announces to the responding station 701 that a subsequent frame will be a ToF request being made by the initiating station 700. A short inter-frame space (SIFS) time interval may then occur between the ToF-A frame and the initiating station 700 transmitting a null data packet frame (NDP-1) to the responding station 701 at ToD(NDP-1)=$t_1$.

A SIFS interval may b defined as a time period of a particular size. The time period takes into account a time it takes for the arrival of the ToF-A frame to arrive at the antenna for the responding station 701 until a modem of the responding station 701 perceives it is receiving data. Additionally, SIFS also includes the time it takes the media access control (MAC) of the responding station 701 to process a frame and prepare a response. Finally, the SITS also may include any time for the responding station 701 to transition from a receive mode to a transmit mode.

Null data packets may be used for measuring the channel information and timing. As the name implies, the null data packet is a frame that does not include any payload (e.g., data). Such a frame may only include the preamble for receiver training purposes as well as a means for determining the channel information.

The responding station 701 may receive the training frame of the NDP-1 frame at TF_ToA(NDP-1)=$t_2$'. Another SIFS time interval may be used during which the responding station may be determining, using the NDP-1 frame preamble, the channel information for the channel between the initiating station 700 and the responding station 701.

The responding station 701, after the SIFS time interval, may then transmit a ToF response frame (ToF-R) to the initiating station 700. The ToF-R frame may include the just determined channel information as well as ToA $t_2$' and ToD $t_3$. The ToD $t_3$ refers to the ToD of the subsequent NDP-2 frame transmitted by the responding station 701 to the initiating station 700 and may be calculated prior to the actual transmission. The initiating station 700 may then receive the training frame of the NDP-2 frame at TF_ToA(NDP-2)=$t_4$'. The initiating station 700 may use the preamble of the NDP-2 frame to determine the channel information for the channel between the responding station 701 and the initiating station 700.

The initiating station 700 may then determine the ToF distance measurement using the channel information for the channel between the initiating station 700 and the responding station 701, that was transmitted by the responding station 701, and the channel information for the channel between the responding station 701 and the initiating station 700, that was determined by the initiating station 700. The initiating station 701 may use the calculation ToF=[D+($t_4'$−$t_1$)−($t_3$−$t_2'$)]/2. The NDP approach may allow greater flexibility with types of channels that can be measured (e.g., bandwidth, multiple inputs multiple outputs, beam formed). The SITS time interval may allow the modem on either side of the channel to prepare for the next frame.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, a system may include one or more processors and may be configured with instructions stored on a computer-readable storage device.

Examples

The following examples pertain to further embodiments.

Example 1 is a method for time-of-flight (ToF) positioning in a wireless network. The method comprises transmitting a request frame over a first channel from an initiating station to a responding station; receiving a response frame from the responding station over a second channel from the responding station to the initiating station, the response frame comprising first channel information for the first channel; the initiating station determining second channel information of the second channel; and the initiating station determining the ToF positioning at least partially in response to the first channel information and the second channel information.

In Example 2, the subject matter of Example 1 can optionally include wherein the request frame is transmitted from the initiating station at a first time and received by the responding station at a second time, the method further comprises: receiving, at a fourth time, a first acknowledgement frame transmitted, at a third time, from the responding station to the initiating station in response to the request frame; and the initiating station transmitting a second acknowledgement frame to the responding station in response to the response frame.

In Example 3, the subject matter of Examples 1-2 can optionally include wherein receiving the response frame further comprises receiving the response frame comprising the first channel information, the second time, and the third time.

In Example 4, the subject matter of Examples 1-3 can optionally include wherein the initiating station determining the ToF positioning comprises determining the ToF positioning in response to the first channel information, the second channel information, the first time, the second time, the third time, and the fourth time.

In Example 5, the subject matter of Examples 1-4 can optionally include wherein the initiating station determining the ToF positioning comprises the initiating station determining the ToF positioning by: determining around trip time as a difference between the fourth time and the first time; determining a responder delay as a difference between the third time and the second time; determining a difference between the round trip time and the responder delay; and determining half of a sum of the difference between the round trip time and the responder delay and a sum of channel corrections from the first and second channel information.

In Example 6, the subject matter of Examples 1-5 can optionally include wherein the second time is a time of receipt of a training frame associated with the request frame and the fourth time is a time of receipt of a training frame associated with the first acknowledgement frame, the method further comprising: determining an actual time of arrival of the request frame after correction of the request frame from the first channel information; and determining an actual time of arrival of the first acknowledgement frame after correction of the first acknowledgement frame from the second channel information.

In Example 7, the subject matter of Examples 1-6 can optionally include wherein the response frame further comprises a symbol start time tsymbStart within the request frame of a particular symbol.

In Example 8, the subject matter of Examples 1-7 can optionally include the initiating station determining a time of arrival of the response frame by $t_{symbStart}+\Delta t-t_{HW-delay}$, where Dt represents a time different between $t_{symbStart}$ and receipt of a first line of sight peak of a signal from the responding station and $t_{HW-delay}$ represents a delay imposed by the responding station.

In Example 9, the subject matter of Examples 1-8 can optionally include wherein the ToF positioning is performed continuously.

In Example 10, the subject matter of Examples 1-9 can optionally include wherein the request frame comprises a first null data packet frame and the response frame comprises a second null data packet frame.

Example 11 is a method for time-of-flight (ToF) positioning in a wireless network, the method comprises a responding station receiving, from an initiating station, a request frame over a first channel; the responding station calculating the ToF positioning in response to previous first channel information and previous second channel information as determined by a previous request frame and a previous response frame, respectively, in a previous ToF positioning request transmitted prior to the request frame; and transmitting a response frame over a second channel to the initiating station, the response frame comprising the ToF positioning of the initiating station.

In Example 12, the subject matter of Example 11 can optionally include wherein the responding station calculating the ToF positioning comprises the responding station calculating the ToF positioning in response to [$D^{(k-1)}$+($t_4'^{(k-1)}$−$t_1^{(k-1)}$)−($t_3^{(k-1)}$−$t_2'^{(k-1)}$)]/2 where $D^{(k-1)}$ represents a sum of channel corrections front the previous first channel information and the previous second channel information, $t_1^{(k-1)}$ represents a transmission time of the previous request frame, $t_2'^{(k-1)}$ represents a receipt time of the previous request frame by the responding station, $t_3^{(k-1)}$ represents a transmission time of the previous response frame, and $t_4'^{(k-1)}$ represents a receipt e of the previous response frame by the initiating station.

In Example 13, the subject matter of Examples 11-12 can optionally include wherein the request frame comprises the previous first channel information, $t_4'^{(k-1)}$, and $t_1^{(k-1)}$.

In Example 14, the subject matter of Examples 11-13 can optionally include performing a subsequent ToF positioning in response to first Channel information of the first channel and second channel information of the second channel.

Example 15 is an 802.11 network comprising an initiating station to determine a time-of-flight (ToF) position with respect to a responding station, the initiating station configured to: transmit a request frame to the responding station, over a first channel, for measurement of the ToF position; receive a response frame from the responding station, over a second channel, comprising first channel information, a received time of the request frame, and a transmit time of the response frame and calculate the ToF position in response to the response frame and second channel information of the second channel.

In Example 16, the subject matter of Example 15 can optionally include wherein the initiating station comprises a wireless mobile station.

In Example 17, the subject matter of Examples 15-16 can optionally include wherein the responding station comprises an access point.

In Example 18, the subject matter of Examples 15-17 can optionally include wherein the initiating station is further to transmit an action frame to the responding station wherein the action frame comprises the second channel information, a received time of an acknowledgement frame from the responding station, and a transmit time of the request frame.

In Example 19, the subject matter of Examples 15-18 can optionally include wherein the response frame further comprises tokens, time offsets, and frequency offsets.

In Example 20, the subject matter of Examples 15-19 can optionally include wherein the initiating station is further to receive an acknowledgement frame from the responding station in response to the request frame and transmit an acknowledgement frame to the responding station in response to the response frame.

Example 21 is a non-transitory computer-readable storage medium that stores instructions for execution by one or more processors to configure a wireless communication device to perform time-of-flight position calculations, the operations comprising: transmitting a request frame to a responding station, over a first channel with first channel information, to request measurement of the ToF position; receiving an acknowledgement frame from the responding station over a second channel with second channel information; receiving a response frame from the responding station over the second channel, the response frame comprising the first channel information, a time-of-arrival of the request frame, and a time-of-departure of the response frame; and calculating the ToF position in response to the first channel information, the second channel information, the time-of-arrival of the request frame, and the time-of-departure of the response frame:

In Example 22, the subject matter of Example 21 can optionally include wherein the operations further comprise: calculating the ToF position further in response to a time-of-departure of the request frame, a time-of-arrival of the response frame, and a sum of channel corrections from the first channel information and the second channel information.

Example 23 is an 802.11 network comprising an initiating station to determine a time-of-flight (ToF) position with respect to a responding station, the initiating station comprising: means for transmitting a request frame to the responding station, over a first channel, for measurement of the ToF position; means for receiving a response frame from the responding station, over a second channel, comprising first channel information, a received time of the request frame, and a transmit time of the response frame; and means for calculating the ToF position in response to the response frame and second channel information of the second channel.

In Example 24, the subject matter of Example 23 can optionally include wherein the means for transmitting the request frame comprises physical layer circuitry.

In Example 25, the subject matter of Examples 23-24 can optionally include wherein the means for calculating the ToF position comprises processing circuitry.

Example 26 is an initiating station to determine a time-of-flight (ToF) position with respect to a responding station in an 802.11 network, the initiating station comprising: a physical layer to transmit a request frame to a responding station, over a first channel, for measurement of the ToF position and receive a response frame from the responding station, over a second channel, comprising first channel information, a received time of the request frame, and a transmit time of the response frame; and a processing layer to calculate the ToF position in response to the response frame and second channel information of the second channel.

In Example 27, the initiating station of Example 26 can optionally include wherein the wireless communication station comprises a wireless mobile station.

In Example 28, the initiating station of Examples 26-27 can optionally include wherein the responding station comprises an access point.

In Example 29, the initiating station of Examples 26-28 can optionally include wherein the physical layer is further to transmit an action frame to the responding station wherein the action frame comprises the second channel information, a received time of an acknowledgement frame from the responding station, and a transmit time of the request frame.

Example 30 is a non-transitory computer-readable storage medium that stores instructions for execution by one or more processors to configure a wireless communication device to perform time-of-flight position calculations, the operations comprising: receiving a request frame from an initiating station, over a first channel with first channel information, to request measurement of the ToF position; transmitting an acknowledgement frame to the initiating station over a second channel with second channel information; transmitting a response frame to the initiating station over the second channel, the response frame comprising the first channel information, a time-of-arrival of the request frame, and a time-of-departure of the response frame; and calculating the ToF position in response to the first channel information, the second channel information, the time-of-arrival of the request frame, and the time-of-departure of the response frame.

In Example 31, the non-transitory computer-readable storage medium of claim 30 can optionally include subject matter wherein the operations further comprise: calculating the ToF position further in response to a time-of-departure of the request frame, a time-of-arrival of the response frame, and a sum of channel corrections from the first channel information and the second channel information.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a station (STA) configured to operate in a wireless local area network (WLAN), the apparatus to cause the STA to perform, as an initiator, a time-of-flight (ToF) measurement protocol with a responder, the apparatus comprising:
 processing circuitry to generate an announcement packet and a first a null-data packet (NDP) for transmission to the responder as a first sequence;
 processing circuitry to initiate transmission by the STA of the first sequence such that the first NDP follows the announcement packet by a short inter-frame space (SIFS); and
 processing circuitry to initiate reception by the STA of a second sequence after a SIFS following transmission of the first sequence, the second sequence comprising a second NDP and a measurement response, wherein the measurement response includes a time of arrival of the first NDP and a time of departure of the second NDP; and
 processing circuitry to cause the STA to perform, as the initiator, a ToF computation to determine a distance to the responder, the TOF computation based on the measurement response.

2. The apparatus of claim 1, wherein in the second sequence the second NDP and the measurement response are separated by a SIFS.

3. The apparatus of claim 1, wherein the first sequence and the second sequence are communicated in a first measurement round, and wherein the measurement response includes a delayed report representing measurements from a previous measurement round preceding the first measurement round.

4. The apparatus of claim 1, wherein the responder is an access point (AP) and wherein the STA is a non-AP station; and
 wherein the announcement packet and the first NDP of the first sequence are uplink packets from the STA to the AP; and
 wherein the second NDP and the measurement response of the second sequence are downlink packets from the AP to the STA.

5. The apparatus of claim 1, wherein the STA is an access point (AP) and wherein the responder is a non-AP station;
 wherein the announcement packet and the first NDP of the first sequence are downlink packets from the AP to the non-AP station; and
 wherein the second NDP and the measurement response of the second sequence are uplink packets from the non-AP station to the AP.

6. The apparatus of claim 1, further comprising:
 physical layer circuitry to transmit the first sequence and receive the second sequence.

7. An apparatus of a station (STA) configured to operate in a wireless local area network (WLAN), the apparatus to cause the STA to perform, as a responder, a time-of-flight (ToF) measurement protocol with an initiator, the apparatus comprising:
 processing circuitry to initiate reception, by the STA, of an announcement packet and a first a null-data packet (NDP) from the responder as a first sequence, wherein the first NDP follows the announcement packet by a short inter-frame space (SIFS); and
 processing circuitry to generate a second sequence comprising a second NDP and a measurement response, wherein the measurement response includes a time of arrival of the first NDP and a time of departure of the second NDP;

processing circuitry to cause the STA to initiate transmission by the STA of the second sequence after a SIFS following reception of the first sequence; and
 wherein in the ToF measurement protocol the STA is to refrain from performing a ToF computation to determine a distance to the initiator.

8. The apparatus of claim 7, wherein in the second sequence the second NDP and the measurement response are separated by a SIFS.

9. The apparatus of claim 7, wherein the first sequence and the second sequence are communicated in a first measurement round, and wherein the measurement response includes a delayed report representing measurements from a previous measurement round preceding the first measurement round.

10. The apparatus of claim 7, wherein the initiator is an access point (AP) and wherein the STA is a non-AP station;
 wherein the announcement packet and the first NDP of the first sequence are downlink packets from the AP to the STA; and
 wherein the second NDP and the measurement response of the second sequence are uplink packets from the STA to the AP.

11. The apparatus of claim 7, wherein the STA is an access point (AP) and wherein the initiator is a non-AP station; and
 wherein the announcement packet and the first NDP of the first sequence are uplink packets from the non-AP station to the STA;
 wherein the second NDP and the measurement response of the second sequence are downlink packets from the STA to the non-AP station.

12. The apparatus of claim 7, further comprising:
 physical layer circuitry to receive the first sequence and transmit the second sequence.

13. At least one non-transitory machine-readable medium comprising instructions that, when executed by a station (STA) configured to operate in a wireless local area network (WLAN), cause the STA to perform, as an initiator, a time-of-flight (ToF) measurement protocol with a responder, the instructions to cause the STA to:
 generate an announcement packet and a first a null-data packet (NDP) for transmission to the responder as a first sequence;
 initiate transmission of the first sequence such that the first NDP follows the announcement packet by a short inter-frame space (SIFS);
 initiate reception of a second sequence after a SIFS following transmission of the first sequence, the second sequence comprising a second NDP and a measurement response, wherein the measurement response includes a time of arrival of the first NDP and a time of departure of the second NDP; and
 perform, as the initiator, a ToF computation to determine a distance to the responder, the TOF computation based on the measurement response.

14. The at least one machine-readable medium of claim 13, wherein in the second sequence the second NDP and the measurement response are separated by a SIFS.

15. The at least one machine-readable medium of claim 13, wherein the first sequence and the second sequence are communicated in a first measurement round, and wherein the measurement response includes a delayed report representing measurements from a previous measurement round preceding the first measurement round.

16. The at least one machine-readable medium of claim 13, wherein the announcement packet and the first NDP of the first sequence are uplink packets; and wherein the second NDP and the measurement response of the second sequence are downlink packets.

17. The at least one machine-readable medium of claim 13, wherein the announcement packet and the first NDP of the first sequence are downlink packets; and wherein the second NDP and the measurement response of the second sequence are uplink packets.

18. At least one non-transitory machine-readable medium comprising instructions that, when executed by a station (STA) configured to operate in a wireless local area network (WLAN), cause the STA to perform, as a responder, a time-of-flight (ToF) measurement protocol with an initiator, the instructions to cause the STA to:

initiate reception of an announcement packet and a first a null-data packet (NDP) from the responder as a first sequence, wherein the first NDP follows the announcement packet by a short inter-frame space (SIFS);

generate a second sequence comprising a second NDP and a measurement response, wherein the measurement response includes a time of arrival of the first NDP and a time of departure of the second NDP; and initiate transmission of the second sequence after a SIFS following reception of the first sequence; and refrain from performing a ToF computation to determine a distance to the initiator.

19. The at least one machine-readable medium of claim 18, wherein in the second sequence the second NDP and the measurement response are separated by a SIFS.

20. The at least one machine-readable medium of claim 18, wherein the first sequence and the second sequence are communicated in a first measurement round, and wherein the measurement response includes a delayed report representing measurements from a previous measurement round preceding the first measurement round.

21. The at least one machine-readable medium of claim 18, wherein the announcement packet and the first NDP of the first sequence are downlink packets; and wherein the second NDP and the measurement response of the second sequence are uplink packets.

22. The at least one machine-readable medium of claim 18, wherein the announcement packet and the first NDP of the first sequence are uplink packets; and wherein the second NDP and the measurement response of the second sequence are downlink packets.

* * * * *

UNITED STATES PATENT AND TRADEMARK OFFICE
CERTIFICATE OF CORRECTION

PATENT NO. : 10,064,154 B2
APPLICATION NO. : 15/015308
DATED : August 28, 2018
INVENTOR(S) : Banin et al.

Page 1 of 1

It is certified that error appears in the above-identified patent and that said Letters Patent is hereby corrected as shown below:

On the Title Page

On page 2, in Column 2, item (56) under "Foreign Patent Documents", Line 8, delete "201413791" and insert --2014137391-- therefor On page 2, in Column 2, item (56) under "Other Publications", Line 33, delete "Aug. 2, 20160"," and insert --Aug. 2, 2016",-- therefor On page 2, in Column 2, item (56) under "Other Publications", Line 37, delete "Apr. 17, 2017"," and insert --Apr. 18, 2017",-- therefor On page 2, in Column 2, item (56) under "Other Publications", Line 42, delete "dumb" and insert --durch-- therefor Signed and Sealed this
Eleventh Day of June, 2019

Andrei Iancu
*Director of the United States Patent and Trademark Office*